Sept. 22, 1970        C. A. THOMAS        3,529,854

PIPE-JOINTING SLEEVE

Filed Jan. 21, 1969        2 Sheets-Sheet 1

INVENTOR
CARL A. THOMAS

BY McGlew and Toren
ATTORNEYS

Sept. 22, 1970  C. A. THOMAS  3,529,854

PIPE-JOINTING SLEEVE

Filed Jan. 21, 1969  2 Sheets-Sheet 2

INVENTOR
CARL A. THOMAS

BY McSleuand Toren
ATTORNEYS

United States Patent Office 3,529,854
Patented Sept. 22, 1970

3,529,854
PIPE-JOINTING SLEEVE
Carl A. Thomas, Hamburg, Germany, assignor to Jurid Werke GmbH, Glinde, near Hamburg, Germany
Filed Jan. 21, 1969, Ser. No. 792,526
Int. Cl. F16l 21/06
U.S. Cl. 285—322                                      6 Claims

ABSTRACT OF THE DISCLOSURE

A pipe-jointing sleeve for clamping over sealing tubes by means of hose clips for connecting socketless pipes to one another, wherein a circumferential groove is arranged on the outside around the center of the sleeve and a circumferential flange is arranged at the center inside the sleeve and axial slots extend from the rims of the sleeve towards the groove. Two concentric strengthening ribs may be provided adjacent the groove.

---

This invention relates in general to the construction of connector sleeves for joining pipe ends and in particular to a new and useful connector sleeve construction and pipe union including a sleeve having an inwardly projecting web adapted to be positioned between the ends of the two pipes to be joined and an exterior wall with at least one strengthening rib and with rims at each end having inwardly extending slots defined around the circumference thereof.

This connector sleeve of the invention is particularly useful for quick and easy mounting upon a pair of pipe ends presented to each other to provide a joint of improved mechanical stability adapted to sustain high pressure.

The connector sleeve comprises a substantially cylindrical member with a circumferential external groove arranged around the middle of the sleeve casing and with a circumferential internal web arranged around the middle of the sleeve casing and slots extending from the rims of the sleeve to the middle of the sleeve. Two concentric strengthening ribs may be provided adjacent to the groove and in this case the slots extend from the rim of the sleeve to the vicinity of the associated strengthening rib.

The sleeve according to the invention can be made from any flexible plastics material or even from another elastic material, for example sheet steel; for processing reasons and for the purpose of a simple construction, a plastics material such as, for example, a polyamide, polyethylene or polypropylene or even a polyvinyl chloride or polyester material or the like is preferably used as the structural material for the sleeve according to the invention.

For enlarging the stress area and at the same time facilitating construction, the sleeve according to the invention can be suitably formed, in the unstressed state, so as to converge from either end towards the middle to form a conical taper.

With known connector sleeves of this kind, the mechanical stability is lessened, because the action of pressure perpendicular to the surface of the groove-free center part of the sleeve, for example, from underneath when tubes traversed by pressure media are connected by them, or from the top when they serve to connect the tubes of vacuum lines, causes stresses to act at the slotted parts and this can lead to splitting or other damage.

The invention is based upon the fact that the particular cross-sectional form selected takes into consideration that, by a suitable arrangement of grooves, webs, ribs and slots, the stress area becomes as large as possible, with constant mechanical stability.

In order that the sleeve cannot expand through internal pressure in the pipeline, the two concentric strengthening ribs are located next to and on either side of the groove which is arranged on the outside in the middle. The stress area is at its greatest when the slots extending from the edge almost reach the strengthening ribs.

Assembly can be very easily carried out and facilitated if the hose clips which are used for tightening up the joint are secured against axial displacement in known manner by beads which can be provided on the sleeve according to the invention. A pipe union, generally consisting of two hose clips, the sleeve according to the invention and an internal sealing sleeve or ring, can be supplied complete, i.e. without any parts which can be easily lost, to the place of assembly, whereby the shortest possible assembly times can be attained.

During assembly, it is normal practice to mount the complete pipe union on one end of one of the pipes to be connected and to insert the end of the other pipe in the thus-mounted pipe union. In exceptional cases, when the sleeve must be placed round from the outside e.g. when the pipe ends to be jointed are already in place and cannot be separated, an embodiment of the invention can be used in which, in known way, one of the slots extending in from the rims runs continuously from one rim to the other. In order to prevent the formation of beads at this point after tightening, a supporting foil can be placed beneath the full-width slot.

Other and further objects of the present invention will appear from the following description in which reference is to be had to the accompanying drawings, constituting a part of this specification, in which similar characters of the reference denote corresponding parts in all the views, and in which.

Figure 1:
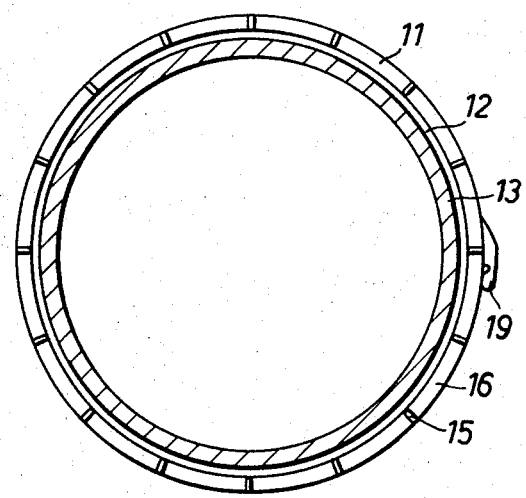
FIG. 1 shows a fully mounted pipe-jointing union with a sleeve according to the invention, seen in the axial direction.

FIG. 1 shows a pipe section 13 on which a sealing tube 12 is firmly clamped by means of the pipe-jointing sleeve 11, the bracing segments 16 of which are formed from slots 15 and are firmly applied against the sealing tube 12. A clamp or lock 19 for each of the two connecting hose clips 10a and 10b, which are shown in detail in FIG. 2, is shown in the closed position.

Figure 2:
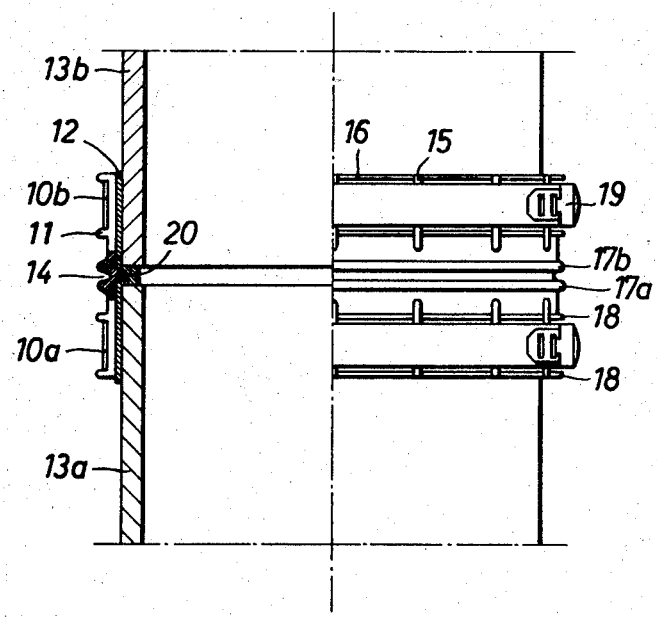
FIG. 2 is a sectional view of the fully-mounted pipe-jointing union of FIG. 1.
Figure 3:
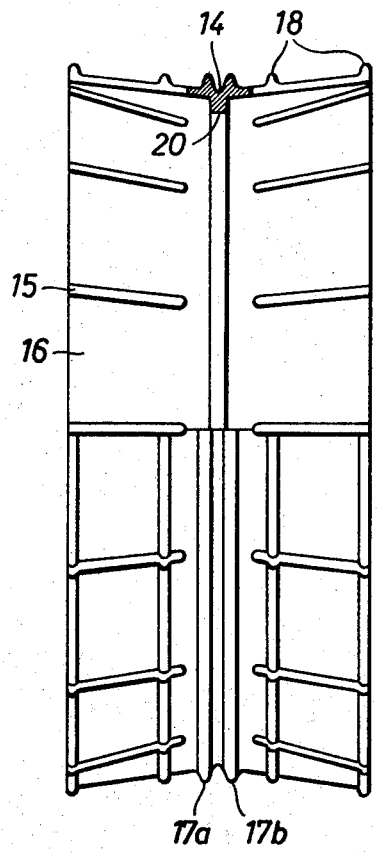
FIG. 3 is a sectional view of the sleeve according to FIGS. 1 and 2, but without any hose clips or seals and in the unstressed state.

As is apparent from FIGS. 2 and 3, a circumferential groove 14 is arranged on the outside of the sleeve 11 around the middle and is backed by a flange or radially inwardly projecting web 20 which is provided around the middle on the inside of the sleeve 11; the web 20 secures the loose connection of the sleeve 11 with the tube 12. As is apparent from FIG. 2, a corresponding circumferential groove is provided in the tube 12 for engaging with the annular web 20. The sleeve 11 is surrounded at the adges by hose clips 10a and 10b and is forced in by means of these hose clips 10a and 10b, to connect the tube to the ends 13a, 13b of the pipe sections. The internal pressure acting outwardly upon the connecting hose clips 10a and 10b is taken up by the two concentric strengthening ribs 17a and 17b which are provided on the sleeve 11.

In order to secure the connecting hose clips 10a and 10b against avial displacement, suitable beads 18 are formed on the sleeve 11. In the unstressed state, the connecting hose clips 10a and 10b are easily rotatable by hand between the beads, so that the lock or clamp 19 can be brought into the best operable position.

The sleeve 11 is conically tapered on both sides in the unstressed state, as can be seen from FIG. 3, for the purpose of making assembly easier.

Although I have illustrated a specific pipe-jointing sleeve, it is apparent that the invention is not limited to the specific forms of construction illustrated, but may be embodied as well in other forms of construction.

I claim:

1. A pipe-jointing sleeve for sealing together the ends of two pipes arranged in end to end relationship, comprising a sleeve having an intermediate interior inwardly projecting web adapted to be located between the ends of the pipes to be joined together, and at least one straight strengthening rib projecting outwardly from the exterior of said sleeve adjacent the location of said web, said sleeve having a peripheral rim at each end with a plurality of inwardly extending slots defined around the circumference thereof said sleeve including two annular strengthening ribs defined on the exterior of said sleeve at axially spaced locations and having a groove therebetween arranged in the same plane as said web, the slots defined in said rims extending axially inwardly toward the respective ribs.

2. A pipe-jointing sleeve, according to claim 1, wherein said sleeve comprises an elastic synthetic material.

3. A pipe-jointing sleeve, according to claim 1, wherein said sleeve is of an elastic material, said web and said strengthening ribs being located centrally thereon, said sleeve having an outwardly conical taper on each side of said web in the unstressed state.

4. A pipe-jointing sleeve, according to claim 1, including two sets of circumferentially extending axially spaced projecting beads at two axially spaced locations on each side of said strengthening rib for retaining hose clips thereon.

5. A pipe-jointing sleeve, according to claim 1, including on the exterior of said sleeve a set of two spaced beads arranged on each side of said ribs, said beads of each set being spaced apart by an amount to accommodate a hose clamp therebetween, said sleeve being made of a resilient material with the sides on each side of each said web being widened conically outwardly in the unstressed state.

6. A pipe-union comprising first and second pipes arranged in end to end closely spaced arrangement, a sleeve having an intermediate interior inwardly projecting web located between said first and second pipes, at least one strengthening rib projecting outwardly on the exterior of said sleeve adjacent the location of said interior web, said sleeve having a peripheral rim at each end with a plurality of inwardly and axially extending slots defined around the circumference, and wherein there are two circumferentially extending strengthening ribs defined on the exterior of said sleeve and projecting outwardly from the surface thereof, said ribs defining a groove therebetween which is in alignment with said interior web, and a sealing tube disposed between said sleeve and said first and second pipes, said web bearing against said sealing tube and holding it in the space between the ends of said first and second pipes.

References Cited

UNITED STATES PATENTS

| | | | |
|---|---|---|---|
| 2,383,692 | 8/1945 | Smith | 285—322 |
| 2,936,186 | 5/1960 | Dunmire | 285—373 |
| 3,104,898 | 9/1963 | MacDonald et al. | 285—236 |
| 3,394,950 | 7/1968 | Jensen | 285—322 X |

FOREIGN PATENTS

| | | |
|---|---|---|
| 8,830 | 8/1933 | Australia. |
| 79,845 | 8/1955 | Denmark. |
| 867,346 | 5/1961 | Great Britain. |

DAVE W. AROLA, Primary Examiner

U.S. Cl. X.R.

285—369